(12) United States Patent
Talbot

(10) Patent No.: US 9,778,904 B2
(45) Date of Patent: Oct. 3, 2017

(54) MOTOR VEHICLE AND METHOD OF CONTROLLING A MOTOR VEHICLE

(75) Inventor: Kevin Talbot, Lighthorne (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 123 days.

(21) Appl. No.: 13/984,577

(22) PCT Filed: Feb. 10, 2012

(86) PCT No.: PCT/EP2012/052275
§ 371 (c)(1),
(2), (4) Date: Oct. 21, 2013

(87) PCT Pub. No.: WO2012/107546
PCT Pub. Date: Aug. 16, 2012

(65) Prior Publication Data
US 2014/0039720 A1  Feb. 6, 2014

(30) Foreign Application Priority Data
Feb. 10, 2011 (GB) .................................... 1102286.0

(51) Int. Cl.
| G05D 1/00 | (2006.01) |
| G05D 3/00 | (2006.01) |
| G06F 7/00 | (2006.01) |
| G06F 17/00 | (2006.01) |
| B60L 1/00 | (2006.01) |
| B60R 16/023 | (2006.01) |

(Continued)

(52) U.S. Cl.
CPC .................. *G06F 7/00* (2013.01); *B60L 1/00* (2013.01); *B60R 16/0232* (2013.01); *F02D 41/042* (2013.01); *F02D 41/22* (2013.01); *F02D 41/26* (2013.01); *G06F 11/0739* (2013.01); *G06F 11/0757* (2013.01); *G06F 11/0793* (2013.01)

(58) Field of Classification Search
CPC ...................................... G06F 7/00; B60L 1/00
USPC ............ 701/1; 307/10.1; 304/5.2; 340/309.9
See application file for complete search history.

(56) References Cited

U.S. PATENT DOCUMENTS

| 4,864,154 A | 9/1989 | Copeland et al. |
| 5,190,009 A | 3/1993 | Kadota |

(Continued)

FOREIGN PATENT DOCUMENTS

| GB | 2317275 A | 3/1998 |
| JP | 2000172384 A | 6/2000 |

(Continued)

OTHER PUBLICATIONS

International Search Report for PCT/EP2012/052275 dated May 22, 2012, 4 pages.

(Continued)

*Primary Examiner* — Mahmoud Ismail
(74) *Attorney, Agent, or Firm* — Reising Ethington P.C.

(57) ABSTRACT

The present invention provides a method of managing shut down of a motor vehicle (100) comprising the steps of determining (S207) by means of a computing device that it is required to shut down the vehicle and, responsive to the determination that it is required to shut down the vehicle (PM=1), forcing shutdown of the vehicle (S212) by means of the computing device after a prescribed time period has elapsed (S211) if the motor vehicle has not shut down within the prescribed time period.

15 Claims, 7 Drawing Sheets

(51) Int. Cl.
  *F02D 41/04*   (2006.01)
  *G06F 11/07*   (2006.01)
  *F02D 41/22*   (2006.01)
  *F02D 41/26*   (2006.01)
  *G08B 1/00*    (2006.01)
  *B60L 3/00*    (2006.01)
  *H02G 3/00*    (2006.01)
  *G06F 7/04*    (2006.01)
  *G08B 29/00*   (2006.01)

(56) References Cited

U.S. PATENT DOCUMENTS

| | | |
|---|---|---|
| 6,445,163 B1 | 9/2002 | Chenier et al. |
| 2005/0073394 A1* | 4/2005 | Nimberger ............ B60K 28/08 340/309.9 |
| 2008/0238192 A1* | 10/2008 | Hashimoto ............ H02J 1/14 307/10.1 |
| 2010/0116366 A1 | 5/2010 | Gattozzi et al. |
| 2011/0128118 A1* | 6/2011 | Gilleland ............... B60R 25/24 340/5.2 |

FOREIGN PATENT DOCUMENTS

| | | |
|---|---|---|
| JP | 2010070097 A | 4/2010 |
| JP | 2010116147 A | 5/2010 |
| KR | 20100035416 A | 4/2010 |

OTHER PUBLICATIONS

Great Britain Search Report for application No. GB1102286.0, dated Jun. 14, 2011, 6 pages.

English Summary of Japanese Office Action corresponding to Japanese Patent Application No. 2014-525346, dated Mar. 3, 2015, 1 page.

English translation of Chinese Office Action for CN application No. 201280008584.6, dated Nov. 9, 2016, 12 pages.

* cited by examiner

MOTOR VEHICLE AND METHOD OF CONTROLLING A MOTOR VEHICLE

FIELD OF THE INVENTION

The present invention relates to a controller and to a method of controlling a motor vehicle. In particular but not exclusively the invention relates to a controller and a method of controlling a motor vehicle when it is required to shut down a vehicle. Aspects of the invention relate to a controller, to a vehicle and to a method.

BACKGROUND

It is known to provide a motor vehicle having one or more controllers arranged to control and coordinate operation of one or more vehicle systems. Each controller is arranged to execute a shutdown sequence when it is required to shut down the vehicle.

The shutdown sequence may involve saving by the controller of data to a non-volatile memory (NVM) associated with the controller and subsequently either terminating a supply of power to the controller or assuming by the controller a mode in which a reduced amount of power is consumed by the controller.

The problem exists that if the controller fails to complete the shutdown sequence excessive draining of charge from the vehicle battery can occur whilst a vehicle is left unattended.

It is against this background that the present invention has been conceived. Embodiments of the invention provide a controller, a vehicle or a method which may mitigate one or more of the disadvantages of known vehicle controllers. Other aims and advantages of the invention will become apparent from the following description, claims and drawings.

STATEMENT OF THE INVENTION

Aspects of the invention provide a controller, a motor vehicle and a method as claimed in the appended claims.

According to another aspect of the invention for which protection is sought there is provided a method of managing shutdown of a motor vehicle comprising the steps of:
 (a) determining by means of electronic control means that it is not required for the vehicle to remain in a non-shutdown state; and
 (b) responsive to the determination that it is not required to remain in a non-shutdown state, shutting down automatically the control means, the method comprising the step of forcing shutdown of the control means after a prescribed time period has elapsed if the control means has not shut down within the prescribed time period.

Embodiments of the invention have the advantage that if the electronic control means fails to complete a function that is required to be completed in order to shut down the vehicle, the control means is forced to shut down despite the fact that this function is not complete. The electronic control means may be in the form an electronic controller comprising computing means such as a microcontroller having a microprocessor.

If during shutdown of the vehicle a vehicle control means in the form of a computing device fails to execute shutdown correctly within a prescribed time period, the computing device is forced to shut down.

This overcomes the problem that a vehicle may fail to achieve a required shut down condition because one or more computing devices of the vehicle fail to shut down. In some known arrangements, failure of a computing device to shut down can prevent one or more other computing devices from shutting down, thereby drawing higher values of current from a battery of the vehicle than is normally acceptable for a vehicle in the shutdown condition.

Advantageously step (b) may comprise the step of:
 responsive to the determination that it is not required for the vehicle to remain in a non-shutdown state, executing by the control means computer program code associated with shutdown of the control means thereby to shut down the control means.

Further advantageously the step of shutting down the control means may comprise the step of resetting the control means.

Advantageously the step of resetting the control means may be followed by the step of determining whether it is still not required for the vehicle to remain in a non-shutdown stat. If it is determined that it is still not required for the vehicle to remain in a non-shutdown state, the method may further comprise shutting down the control means.

Optionally step (a) may comprise the step of commencing measurement of elapsed time responsive to the determination that it is not required for the vehicle to remain in a non-shutdown state.

Advantageously step (b) may comprise the step of:
 (b1) executing a portion of a computer program code associated with shutdown of the control means;
 (b2) checking that it is still not required for the vehicle to remain in a non-shutdown state and that the prescribed time period has not elapsed;
 (b3) repeating steps (b1) and (b2) until the control means shuts down or the prescribed time period has elapsed.

Further advantageously step (b1) may comprise the step of executing a portion of a computer program code arranged to update a memory of the vehicle.

Embodiments of the invention have the advantage that if the control means is required to update a memory of the vehicle and one or more processes associated with updating of the memory malfunction resulting in failure to confirm that the memory has been updated, the control means will shut down automatically once the prescribed time period has expired.

Failure to confirm that the memory has been updated may occur for example if a controller of the memory enters a condition in which it does not complete writing of data to the memory.

Still further advantageously at least one of steps (b1) to (b3) may comprise the step of triggering a watchdog function.

By watchdog function is meant a function implemented in hardware (such as a processor of the control means or a processor of the control means dedicated to the watchdog function), firmware, software or any other suitable means whereby if the function is not provided with a 'trigger' command within a prescribed time period of the previous trigger command the function forces the control means to perform a prescribed action such as resetting of a computing device comprised by the control means.

Advantageously the watchdog function may be configured to force a reset of the control means if the watchdog is not itself triggered within a prescribed time period of a preceding trigger. It is to be understood that triggering of the watchdog function may also be described as resetting the watchdog function although this is not to be confused with the role of the watchdog which is to reset the control means if the watchdog is not triggered within the prescribed time period of the immediately preceding watchdog trigger event.

This has the advantage that if the control means itself 'hangs' or otherwise malfunctions such that it fails to continue correctly executing code, the watchdog function forces reset of the control means.

Further advantageously the prescribed period may correspond to a period substantially equal to the maximum expected period of time that may be taken for the control means to shutdown under normal operating conditions without the forced shutdown.

Advantageously the prescribed period may correspond to a period greater than the maximum expected period of time that may be taken for the control means to shutdown under normal operating conditions without the forced shutdown.

This has the advantage that if the vehicle can shut down normally, i.e. without hanging and without any other vehicle control means malfunctioning, the vehicle is permitted to do so before shutdown is forced.

The control means may comprise one or more computing devices.

In a further aspect of the invention for which protection is sought there is provided a motor vehicle comprising at least one control means, the control means being arranged to shutdown when it is required to shut down the vehicle, the control means being configured to:
 (a) determine that it is not required for the vehicle to remain in a non-shutdown state; and
 (b) responsive to the determination that it is not required for the vehicle to remain in a non-shutdown state, force shutdown of the control means after a prescribed time period has elapsed if the control means has not shut down within the prescribed time period.

In a still further aspect of the invention there is provided a method of managing shutdown of a motor vehicle comprising determining that shut-down of the vehicle is required, shutting down at least one controller of the vehicle in dependence on the determination and, if the at least one controller has not shut down within a prescribed time period, forcing shutdown of the at least one controller after the prescribed time period has elapsed.

Advantageously, step (b) may comprise the step of: responsive to the determination that it is required to shut down the vehicle, executing by the control means computer program code associated with shutdown of the control means thereby to shut down the control means.

The step of shutting down the control means may comprise the step of resetting the control means.

Optionally the step of resetting the control means is followed by the step of determining whether shutdown of the vehicle is still required; if it is determined that shutdown of the vehicle is still required, the method may comprise shutting down the control means.

Advantageously step (a) may comprise the step of commencing measurement of elapsed time responsive to the determination that it is required to shut down the vehicle.

Further advantageously step (b) may comprise the step of: (b1) executing a portion of a computer program code associated with shutdown of the control means; (b2) checking that shutdown of the control means is still required and that the prescribed time period has not elapsed; (b3) repeating steps (b1) and (b2) until the control means shuts down or the prescribed time period has elapsed.

Optionally step (b1) comprises the step of executing a portion of a computer program code arranged to update a memory of the vehicle.

Advantageously at least one of steps (b1) to (b3) may comprise the step of triggering (or 'kicking') a watchdog function. The term 'triggering' is not to be confused with the watchdog role of resetting a microcontroller if the watchdog times out, i.e. is not triggered within a prescribed time period of an immediately preceding trigger event.

The watchdog function may be arranged to be triggered even when it is not required to shut down the vehicle.

The watchdog function may be configured to force a reset of the control means if the watchdog is not itself triggered within a prescribed time period.

Advantageously the prescribed period may correspond to a period substantially equal to the maximum expected period of time that may be taken for the control means to shutdown under normal operating conditions without the forced shutdown.

Further advantageously the prescribed period may correspond to a period greater than the maximum expected period of time that may be taken for the control means to shutdown under normal operating conditions without the forced shutdown.

Advantageously the control means may comprise one or more computing devices.

According to yet another aspect of the invention there is provided a motor vehicle comprising at least one control means, the control means being arranged to shutdown when it is required to shut down the vehicle, the control means being configured to: (a) determine that it is required to shut down the vehicle; and (b) responsive to the determination that it is required to shut down the vehicle, force shutdown of the control means after a prescribed time period has elapsed if the control means has not shut down within the prescribed time period.

Advantageously the control means may comprise one or more computing devices.

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
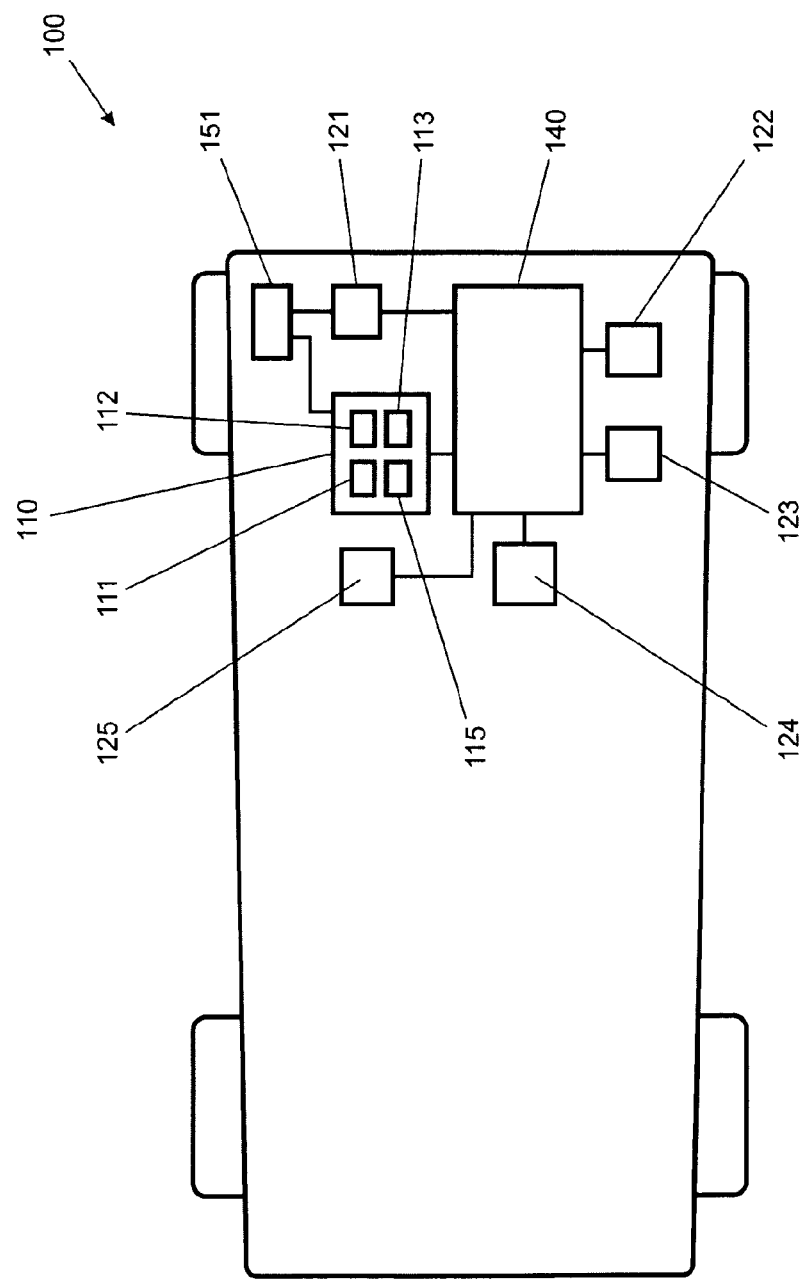
FIG. 1 is a schematic illustration of a known vehicle having an electronic control unit (ECU) (or controller) arranged to transmit power mode information to other electronic control units (or controllers) of the vehicle.

FIG. 1 shows a known vehicle 100 having a number of systems that facilitate operation of the vehicle. Each system has an electronic control unit (also referred to as a controller or control module) arranged to control the respective system.

In the arrangement of FIG. 1 the vehicle 100 has an engine management system controller 121, a vehicle security system controller 122, an anti-lock braking system (ABS) controller 123, an infotainment system controller 124 and a central locking system controller 125.

The vehicle 100 also has a further controller in the form of an electronic control unit (ECU) 110 arranged to communicate power mode information to the other controllers 121-125. When it is required to shut down the vehicle 100 the ECU 110 communicates to the controllers 121-125 that the selected power mode is power mode 0 (zero).

It is to be understood that in some embodiments one of controllers 121-125 may be responsible for communicating the required power mode to the other controllers 121-125, such as the security system controller 122. In some embodiments an instrument cluster controller is provided that is arranged to control an instrument cluster of the vehicle. The instrument cluster controller may also be arranged to transmit power mode information to the other controllers instead of ECU 110.

The controllers 110, 121-125 are in communication with one another by means of a controller area network communications bus (or CAN) 140.

Figure 2:
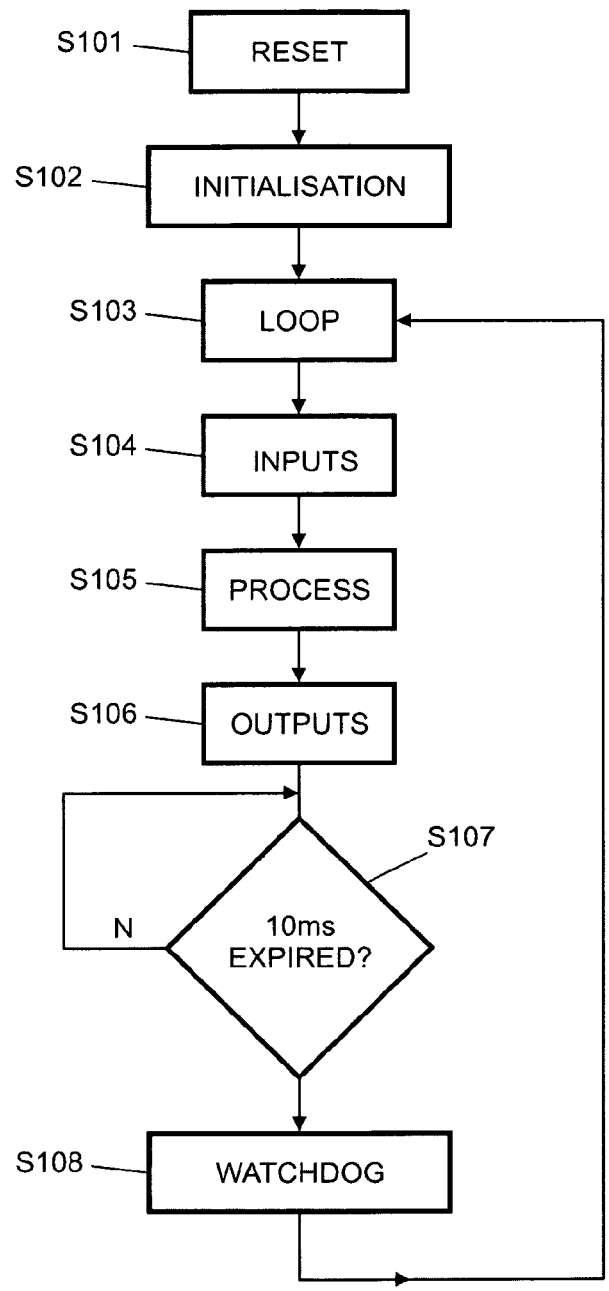
FIG. 2 is a flow chart of a known method of operation of a computing device of an electronic controller of the vehicle of FIG. 1.

Each of the controllers 110, 121-125 is arranged to execute computer program code. FIG. 2 is a flow chart of a sequence of steps repeatedly performed by the controllers 110, 121-125 in one known arrangement.

Execution of the steps by means of the ECU 110 will now be described although it is to be understood that each of the remaining controllers 121-125 also execute code according to a similar sequence.

At step S101, the ECU 110 is reset. Step S101 may be executed for example when power is connected to the ECU 110 or when a watchdog associated with the ECU 110 times out. The ECU 110 is then controlled to enter an active mode.

At step S102 a microprocessor 111 of the ECU 110 performs an initialisation operation in which it configures devices of the ECU 110 itself such as a data direction register (DDR) 112, an analogue to digital converter (ADC) 113 and so forth.

At step S103 the processor 111 begins executing a loop of steps.

At step S104 the processor 111 checks one or more inputs of the processor 111 and at step S105 the processor 111 performs one or more processes responsive to the state of the one or more inputs.

In some known arrangements step S104 and/or step S105 or a further step may include sending and/or receiving data by means of the CAN bus 140.

At step S106 the processor 111 sets one or more outputs of the processor 111 according to a result of the one or more processes of step S105.

At step S107 the processor 111 executes a loop in which a period of 10 ms elapses in order to allow settling of outputs and inputs of the processor.

At step S108 a watchdog is triggered by means of a trigger event. The watchdog is configured to force a reset of the processor 111 if the watchdog is not triggered again within a prescribed period of the previous trigger event.

The processor 111 then continues executing code at step S103.

It is to be understood that when the vehicle 100 is parked and it is required that the vehicle 100 assume a shutdown condition (for example because the driver will leave the vehicle unattended), the ECU 110 is operable to instruct the system controllers 121-125 to assume a shutdown or standby mode in which an amount of power drawn by the controllers 110, 121-125 and the systems associated with the controllers 121-125 is reduced. This is so as to reduce the amount of current drawn from a battery 151 of the vehicle 100 when the vehicle 100 is in the shutdown condition. In the arrangement of FIG. 1 this is performed by the ECU 100 by setting a 'power mode' parameter to a prescribed value. In the arrangement of FIG. 1 the value of the power mode parameter is zero when it is required for the vehicle 100 to assume the shutdown condition. The power mode parameter value is made available to the controllers 110, 121-125 via the CAN bus 140.

Figure 3:
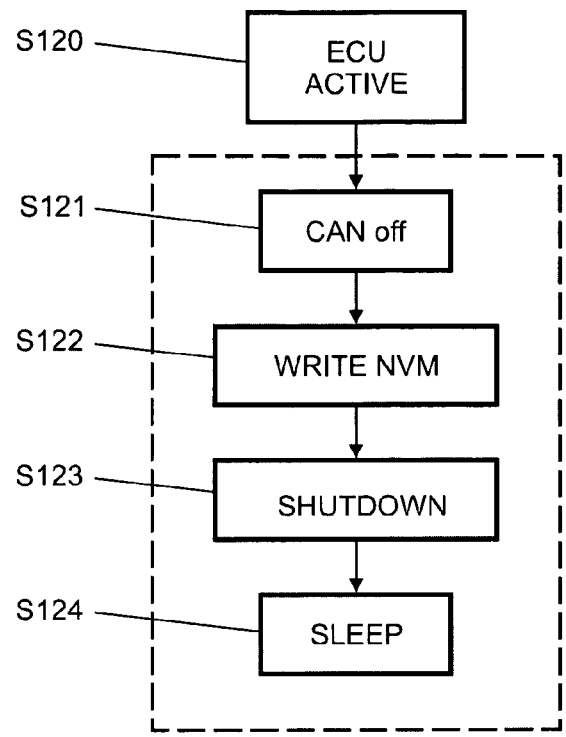
FIG. 3 is a state transition diagram of a final shutdown sequence executed by a known electronic controller.

FIG. 3 is a state transition diagram of a final shutdown sequence executed by the processor 111 when the power mode is set to 0. It is to be understood that each of the other controllers 121-125 are also configured to execute a similar shutdown sequence.

It is to be understood that in the known arrangement described, the final shutdown sequence is a process executed via step S105 of FIG. 2.

At step S121 the processor 111 controls the ECU 110 to cease transmission of data on the CAN bus 140. At step 122 the processor 111 writes data to a non-volatile memory (NVM) 115 of the ECU 110. At step S123 the processor 111 shuts down and at step S124 the processor 111 is in a shutdown or sleep mode.

It is to be understood that if any of the controllers 110, 121-125 fail to reach step S124 and remain awake this may result in excessive drain of the battery 151 of the vehicle 100 such that when the driver returns to the vehicle 100 he or she may be unable to restart the vehicle 100.

For example, step S122 at which writing of data to the NVM 115 is performed may fail to complete. This may be because a controller of the memory 115 hangs, resulting in failure to complete writing of required data. The processor 111 continues to wait for confirmation that the data has been written to the memory 115 resulting in failure of the ECU 110 to shut down.

In arrangements in which it is required to trigger a software (or other) watchdog, it is to be understood that provided the processor 111 does not hang, the processor 111 will continue to trigger the watchdog whilst waiting for the data to be written to the NVM 115. Thus the watchdog is not helpful in recovering the ECU 110 from a malfunction of the NVM 115.

In order to overcome this problem, embodiments of the present invention employ a power-down watchdog (PDW) function. The purpose of the PDW function is to force a shutdown of a controller if the controller fails to shut down following the setting of the power mode value to 0.

Figure 4:
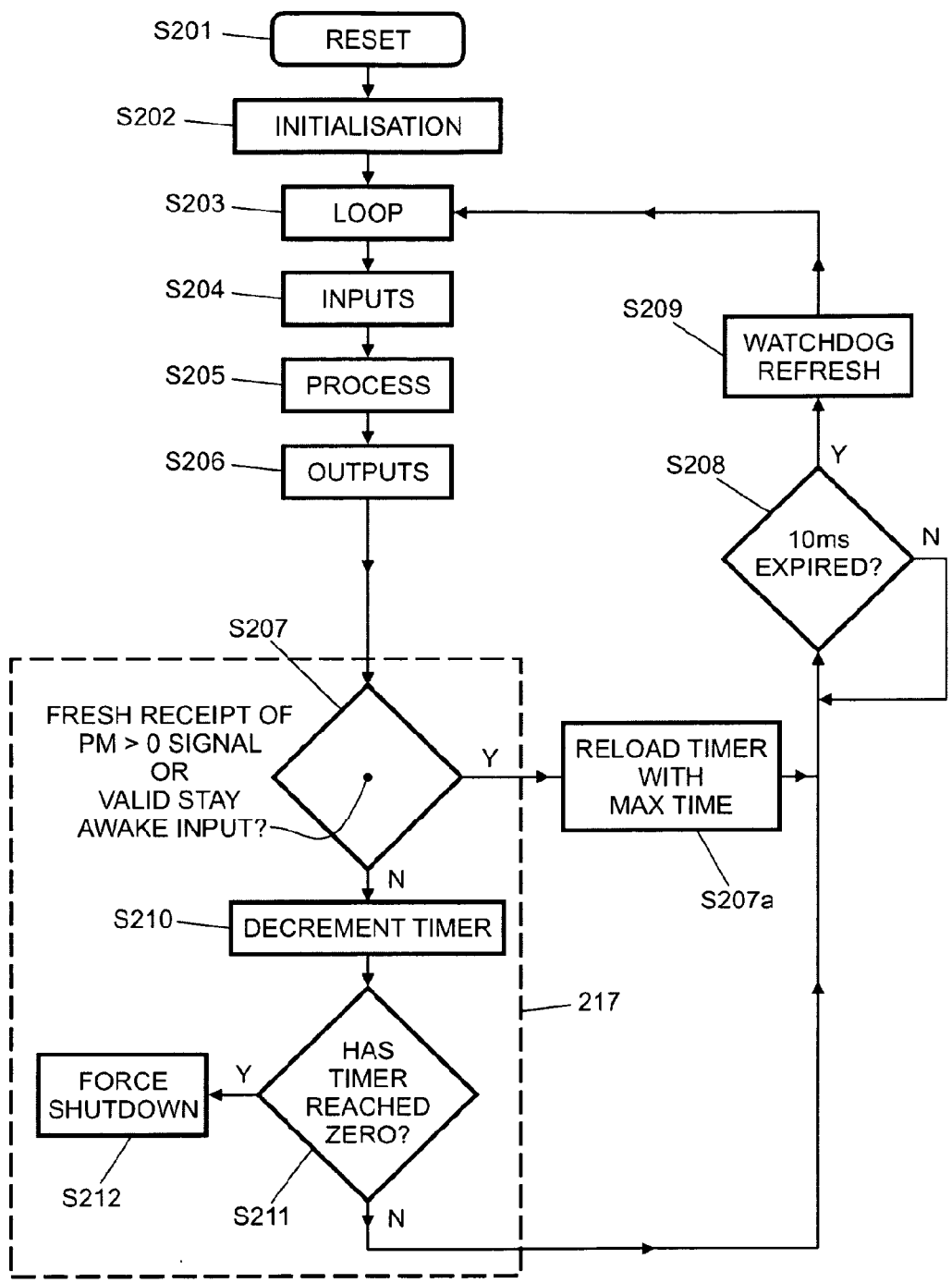
FIG. 4 is a flow chart of a method of operation of a vehicle electronic controller according to an embodiment of the present invention.

FIG. 4 is a flow chart of a sequence of steps repeatedly performed by the processor 111 of the ECU 110 (and corresponding processors of controllers 121-125) when configured to function according to an embodiment of the present invention.

Steps S201 to S206 are similar to steps S101 to S106 of the process of FIG. 2 described above and a description of these processes will not be repeated.

Steps S207 and S210 to S212 describe the operation of the PDW function 217 of the processor 111.

In the arrangement shown, the PDW function 217 is performed before a watchdog refresh is performed at step S209. Thus if for any reason the PDW function 217 is not executed the watchdog refresh function is also not executed, guaranteeing shutdown or reset of the processor 111 if the PDW function 217 is not executed for any reason.

Thus a risk that the PDW function 217 is not executed and the ECU 110 continues to remain awake indefinitely after power mode 0 is assumed is reduced.

In other words, it is to be understood that the processor 111 is programmed such that it does not refresh the watchdog at step S209 without being required to run the PDW function 217. This has the advantage that a risk that the ECU 110 fails to execute shutdown of the vehicle 100 when power mode 0 is assumed is reduced.

In some arrangements the processor 111 is programmed such that it does not execute any loops that do not involve a counter of refreshes that is cleared only by the PDW function 217.

In some arrangements, once a controller commences a shutdown sequence substantially no loops of computer program code are executed by the controller before timing of the prescribed period commences thereby to reduce a risk that the controller fails to be shut down and/or reset once the prescribed period has elapsed.

Where timing of the prescribed period involves incrementing or decrementing a counter, any such loop of code is arranged to increment or decrement the counter.

It is to be understood that whilst the PDW function 217 is shown as a discrete function separate from the watchdog function of step 209, the two functions may be combined in a single watchdog function in some embodiments.

Step S207 is executed following execution of steps S201 to S206. At step S207 the processor 111 checks whether a fresh instruction to remain in a power mode other than power mode zero has been received, and whether a valid input is present that requires the ECU 110 to remain in a non-shutdown condition. The processor 111 performs the check by inspecting a memory of the processor 111 where the required power mode of the vehicle 100 at any given moment in time is stored.

It is to be understood that the term 'fresh' value is used to refer to a 'newly' or 'freshly' received value of power mode that has not yet been 'checked' by the processor 111 at step S207. Once the processor 111 has checked a received value of power mode the value is no longer fresh. A flag may be set to indicate whether or not a received value of power mode is fresh.

If at step S207 it is determined that (i) the value of power mode is set to zero (corresponding to the shutdown mode), or (ii) that a fresh value of power mode having a value greater than zero has not been received and that that a valid input is not present requiring the ECU 110 to remain in a non-shutdown condition, the processor 111 continues to step S210. At step S210 the processor 111 decrements a timer value stored in memory by a prescribed amount.

If at step S207 the memory of the processor 111 indicates that a fresh power mode signal has been received, and that the power mode signal indicates that a power mode other than power mode zero is to be assumed or maintained, the processor continues to step S207*a*. At step S207*a* the processor 111 reloads the timer value with a maximum timer value. That is, the timer value is 'reset'.

The processor also continues from step S207 to step S207*a* if a valid signal is present indicating that the processor 111 should remain in a non-shutdown condition. A non-shutdown condition may be considered to correspond to a condition in which the processor 111 is 'awake'.

In some embodiments at step S207*a* the processor 111 notes the current time according to a clock function of the processor 111 (or an external function in some embodiments) instead of resetting a specific timer value. Other methods of monitoring elapsed since a given moment in time are also useful. For example, the number of times a loop has been executed may be counted. In some arrangements such as the present arrangement each loop involves a 'pause' or delay of a prescribed time period, e.g. 10 ms, before execution of the loop continues. The number of times a loop has been executed since a given moment in time may therefore allow the elapsed time since that moment to be calculated (e.g. by multiplying the length of the pause by the number of times the loop has been executed).

At step S211 the processor 111 checks whether a prescribed time period has elapsed since timing of the prescribed period was begun (or the current time was first noted). In the present embodiment the processor 111 accomplishes this by checking whether the timer value has reached zero. If the timer value has not reached zero, the processor 111 continues to step S208 at which step a 10 ms time period is forced to elapse as in the case of step S107 of the process of FIG. 2.

Once step S208 is complete the processor continues to step S209 at which step a watchdog function is triggered, and then continues executing code at step S203.

The watchdog function executed at step S209 is similar to that executed at step S108 of the process of FIG. 2.

If at step S211 it is determined that the prescribed period has elapsed, the processor continues to step S212 at which shutdown of the ECU 110 is forced.

In some embodiments shutdown of the ECU 110 is forced by resetting the ECU 110, i.e. the processor 111 begins executing code from step S201. In this case, at step S207 the processor recognises that power mode 0 has been selected and therefore attempts to shut down the vehicle 100 a second time.

In the embodiment of FIG. 4 the prescribed time period lapse of which is checked at step S211 corresponds to a period of sufficient length to allow the ECU 110 to shut down under substantially all normal operating conditions. That is, under conditions in which all the possible steps that may be required to be completed by the ECU 110 before shutting down are completed by the ECU 110. The steps that are required to be completed may be executed at steps S204 to S206 as the loop beginning at step S203 repeats successively.

It is to be understood that each of the controllers 110, 121-125 may have a unique prescribed time period associated with step S211. This may be due at least in part to different 'time-out' periods associated with shutdown of the particular system the controller 110, 121-125 is controlling.

It is to be further understood that by 'shutdown condition' is meant a state of a respective controller 121-125 when the vehicle 100 has assumed the shutdown condition. This state may be a state in which the controller and associated system do not draw substantially any current from the battery 151 of the vehicle.

However it is to be understood that one or more controllers such as the vehicle security system controller 122 and central locking system controller 125 may be required to draw a quiescent current when the vehicle is in the shutdown condition in order to service both security and access requirements of the vehicle 100.

It is to be understood that the amount of time taken to shut down the vehicle 100 may vary depending on the driver's actions and the time taken for the state of each of the controllers 121-125 to assume the shutdown condition.

For example, if a driver parks the vehicle 100 and removes a key such as an ignition key, a starter key or other starter device from the vehicle, the vehicle 100 may be arranged to assume power mode 0 and therefore commence the shutdown procedure.

Each controller 110, 121-125 executing code according to FIG. 4 will recognise at step S207 that the vehicle 100 is in power mode 0.

In some arrangements, certain controllers may be required to remain active for a certain period of time even when the power mode value has been set to 0. This may be so that certain required operations can be completed.

For example, in some embodiments if a temperature of the engine or other component such as a supercharger is above a prescribed value the engine management system controller 121 may require to maintain a cooling operation for example by means of an electric cooling fan.

In some embodiments the controller 121 is arranged to power the cooling fan for up to a prescribed maximum period of time, for example up to around 10 minutes before the fan is turned off and the controller 121 shuts down.

The prescribed period of step S211 for the engine management system controller 121 is therefore set to a value slightly longer than the maximum period for which the cooling fan may be powered (e.g. 11 minutes in the above example), allowing sufficient time for the ten minute maximum cooling period to expire and the controller 121 to shut down before a shutdown is otherwise forced at step S212.

Thus it is to be understood that the prescribed period of step S211 associated with each controller 110, 121-125 is arranged to be longer than the maximum time-out period associated with the system controlled by the controller 110, 121-125. This is so that the controller 110, 121-125 has the opportunity to complete shutdown correctly (and save any required data to a memory such as a memory of the controller, e.g. NVM 115). The prescribed time-out periods may be of any required length, for example 10 minutes, 30 minutes or any other suitable length.

By way of a further example, if the infotainment system is switched on when the driver removes the starter key or other starter device, the infotainment system controller 124 may be arranged to shutdown automatically after an infotainment system time-out period has elapsed. Again this period may be of any prescribed length, such as 10 minutes, 30 minutes or any other suitable length as described above with respect to the engine management system controller 121.

Other arrangements are also useful.

Operation of the vehicle 100 according to the process of FIG. 4 has been described with respect to a vehicle 100 having only the controllers 110, 121-125 illustrated in FIG. 1. It is to be understood that in other embodiments a larger or smaller number of controllers may be present. In addition or instead a vehicle may have one or more other tasks that must be completed before shutdown of the vehicle 100 may be completed. Thus a system controlling one or more such further tasks may be configured to output a 'stay awake' signal to one or more of the controllers 110, 121-125 preventing shut-down of one or more of the controllers 110, 121-125 until the one or more further tasks have been completed.

Figure 5:
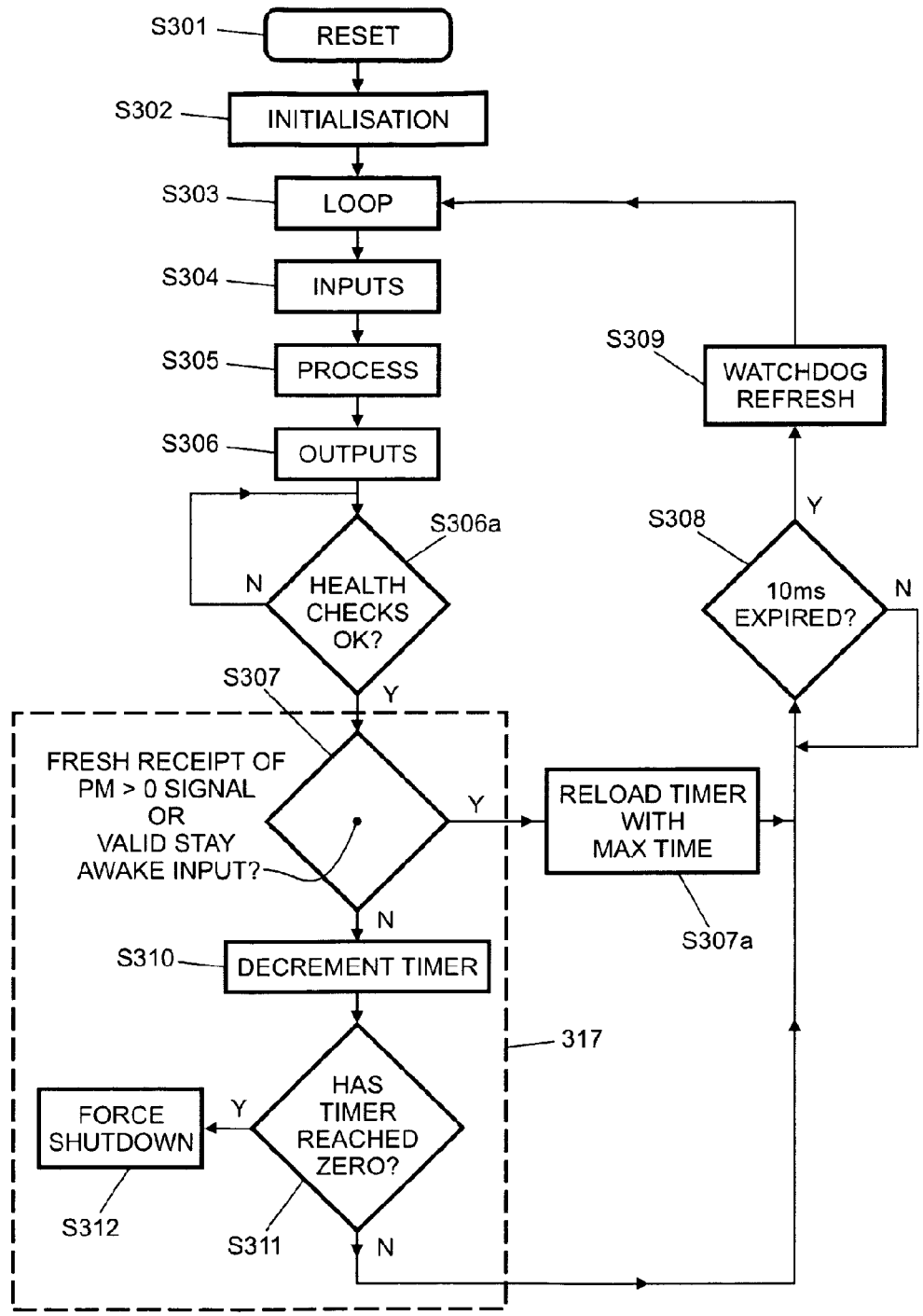
FIG. 5 is a flow chart of a method of operation of a vehicle electronic controller according to a further embodiment of the present invention.

FIG. 5 is a flow chart of a process of managing shutdown of a motor vehicle according to a further embodiment of the invention. Like steps of the embodiment of FIG. 5 to the embodiment of FIG. 4 are provided with like reference signs prefixed numeral 3 instead of numeral 2.

The process of managing shutdown will be described with respect to ECU 110 although it is to be understood that the other controllers 121-125 may also execute shutdown according to a similar method or protocol.

The embodiment of FIG. 5 is similar to that of the embodiment of FIG. 4 except that step S207 of the embodiment of FIG. 4 (which corresponds to step S307 of the embodiment of FIG. 5) is preceded by an additional step, step S306a.

At step S306a the processor 111 of the ECU 110 performs a set of 'health checks' to ensure that the ECU 110 is correctly configured.

At step 306a the processor 111 checks the state of registers that configure the processor 111 such as the DDR 112 and ADC 113. This is at least in part to ensure that no misconfiguration of the ECU 110 will cause the ECU 110 to fail to shut down.

For example, misconfiguration of a channel of the ADC 113 that monitors a wake-up input could cause the processor 111 to believe that the wake up condition is always present. In the case of such corruption of the ADC 113 or if any other health check is failed as part of this step, the processor 111 enters an endless loop by repeating step S306a. This causes the processor 111 to fail to refresh the watchdog at step S309 resulting in a reset of the processor 111 by the watchdog. In the case of such an event, the processor 111 would then begin executing code at step S301. Other arrangements are also useful.

The processor 111 is also arranged to check at step S306a that interrupt masks are correctly set, that the state of the global interrupt disable register is correct and that substantially no illegal states exist.

If it is determined that one or more portions of the ECU 110 are not correctly configured or that an illegal state exists, when the watchdog times out the processor 111 is forced to reset and continue at step S301.

It is to be understood that other arrangements are also useful.

Figure 6:
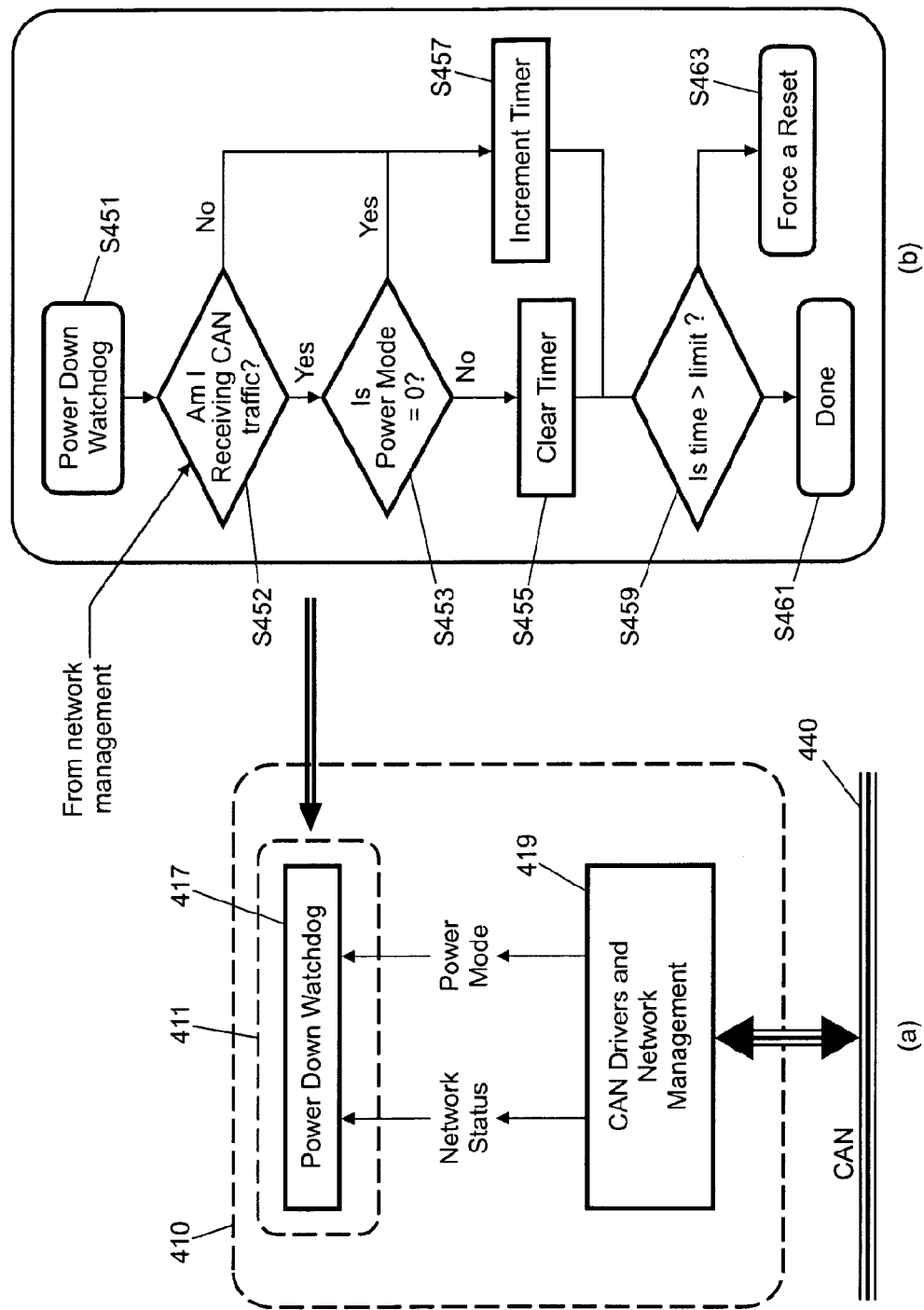
FIG. 6 is a flow chart of a method of operation of a vehicle electronic controller according to an alternative embodiment of the present invention.

FIG. 6 (*a*) is a block diagram of a functionality of a portion of an ECU 410 of a vehicle according to a further embodiment of the invention. Like features of the arrangement of FIG. 6(*a*) to those of FIG. 1 are provided with like reference numerals prefixed numeral 4 instead of numeral 1.

As in the case of the embodiment described by the flow chart of FIG. 5, a CAN bus 440 of the vehicle is coupled to the ECU 410. The ECU 410 is provided with driver software and network management software in respect of the CAN bus 440 allowing communications to take place between the ECU 410 and other vehicle system controllers by means of the CAN bus 440.

The software is arranged to determine the identity of the currently selected power mode of the vehicle as reported by the CAN bus 440 to a PDW function 417 that is implemented by a processor 411 of the ECU 410 in software code.

In addition to the identity of the currently selected power mode of the vehicle the software also determines a status of the CAN bus 440, i.e. whether the CAN bus 440 is in an active mode or a sleep mode.

FIG. 6(b) is a schematic flow diagram of the sequence of steps performed by the PDW function 417.

At step S451 execution of the PDW function 417 begins.

At step S452 it is determined whether network traffic is being received by the processor 411 from the CAN bus 440. If network traffic is not being received, indicating that the CAN bus 440 is in a sleep mode, the processor 411 continues to step S457 at which a timer of the PDW function 417 is incremented. The processor 411 then proceeds to step S459.

If at step S452 the processor 411 determines that network traffic is being received, execution of code continues at step S453.

At step S453 the processor 411 determines whether the vehicle power mode value is set to 0 according to data received from the CAN bus 440. If the power mode value is not set to 0 the processor 411 proceeds to step S455 at which a timer of the PDW function 417 is cleared (or reset, or 'reloaded'). The processor 411 then continues to step S459.

If at step S453 the vehicle power mode value is determined to be 0 then at step S457 a timer of the PDW function 417 is incremented and the processor 411 continues to step S459.

At step S459 the processor 411 checks whether the elapsed time measured by the timer has exceeded a prescribed period. If the elapsed time has exceeded the prescribed period then at step S463 the processor 411 forces a reset of itself.

If the elapsed time has not exceeded the prescribed period then at step S461 the PDW function 417 is complete and execution of further software code by the processor 411 continues.

As in the case of the embodiments of FIG. 4 and FIG. 5 the processor 411 is configured to execute the PDW function 417 during the course of any loop of code executed by the processor 411. This is so as to reduce a risk of the processor 411 failing to shut down when power mode 0 is assumed as a result of becoming locked in an endless loop.

It is to be understood that the advantage of checking the status of the CAN bus 440 is that in some embodiments the CAN bus 440 is configured to assume a sleep mode within a CAN time-out period following the time at which the vehicle assumes power mode 0. Thus the PDW function 417 checks whether the CAN bus 440 has entered the sleep mode and increments the timer if it has. The PDW function 417 increments the timer if the CAN bus 440 has gone to sleep regardless of whether the processor 411 has recognised the vehicle to be in power mode 0.

Thus, if the processor 411 has failed correctly to determine that the vehicle is in power mode 0 when in fact it is, a reset of the processor 411 will occur when the prescribed period expires as determined at step S459.

It is to be understood that the CAN bus 440 may be shut down in some embodiments in order to reduce power consumption by a controller of the CAN bus.

It is to be understood that embodiments of the present invention have the advantage that if a vehicle controller such as a control module associated with a vehicle function hangs or otherwise fails to assume a shutdown condition when it is required to shut down the vehicle, the controller is forced to shut down thereby preventing excessive current drain from the vehicle battery by the controller whilst the vehicle is parked.

Figures 7, 8:
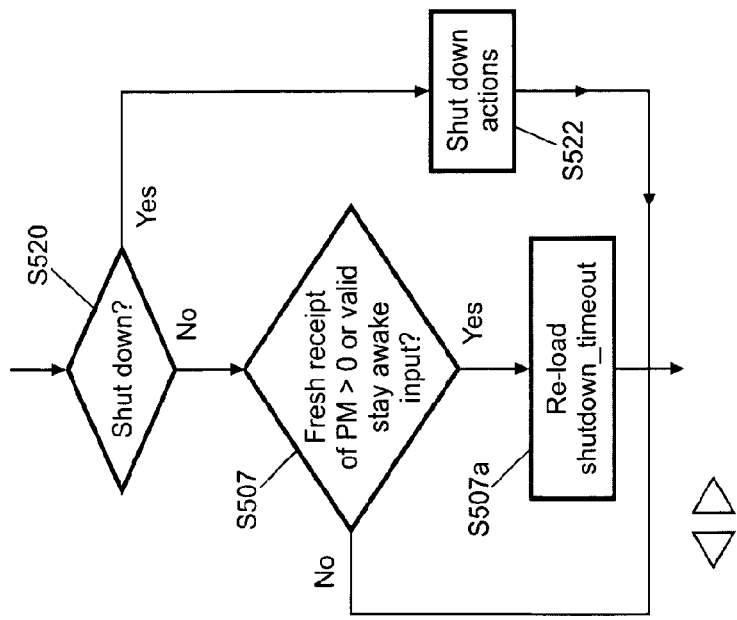
FIG. 7 is a flow chart showing a sequence of steps of computer program code executed by a processor operating according to an embodiment of the invention.
FIG. 8 is a sequence of computer program code instructions executing a watchdog task.

FIG. 7 shows a flowchart of a series of steps performed by a processor 111 of an ECU 110 according to an embodiment of the present invention. Like steps of the chart of FIG. 7 to those of the charts of FIG. 4 and FIG. 5 are shown with like reference signs prefixed S5 rather than S2 or S3.

At step S520 the processor 111 determines whether an explicit requirement to shut down has been received. In the embodiment shown the processor 111 determines whether a power mode parameter of the vehicle has been set to a value of zero indicating the vehicle is to assume a shutdown state. If the power mode parameter does have a value of zero the processor executes step S522 at which one or more shut down actions are executed. The processor then continues executing at a step following step S507a.

If at step S520 it is determined that shut down is not required, the processor 111 continues to step S507.

At step S507 the processor 111 checks whether a fresh instruction to remain in a power mode other than power mode zero has been received, and whether a valid input is present that requires the ECU 110 to remain in a non-shutdown condition. As in the case of the embodiment of FIG. 4 the processor 111 performs the check by inspecting a memory of the processor 111 where the required power mode of the vehicle 100 at any given moment in time is stored. If a fresh instruction to assume a power mode other than zero has been received, or a condition requiring the ECU 110 to remain awake exists, the processor 111 continues to step S507a.

At step S507a a shutdown_timeout parameter (equivalent to a timer parameter value) is reset or reloaded to a 'maximum' value which will subsequently be decremented.

If at step S507 it is determined that no fresh instruction to remain in a power mode other than power mode zero has been received, and no valid input is present that requires the ECU 110 to remain in a non-shutdown condition, the processor 111 continues executing code at a step following step S507a, i.e. step S507a is not executed.

Subsequent to step S507a the processor 111 executes a step at which a watchdog is triggered ('kicked') and subsequently the shutdown_timeout parameter is decremented.

In some embodiments, the step of triggering the watchdog function is performed immediately prior to the step of decrementing the shutdown_timeout parameter. An example of suitable code to accomplish this is shown in the extract of code implementing a watchdog task shown in FIG. 8. Here it can be seen that the instruction shutdown_timeout (which decrements the shutdown_timeout parameter) is executed immediately after the instruction watchdog_kick at which the watchdog is triggered.

It is to be understood that by executing the instruction watchdog_kick immediately before the instruction shutdown_timeout, a risk that the instruction watchdog_kick is executed without execution of the instruction shutdown_timeout is reduced. Thus, if the processor fails to execute the instruction shutdown_timeout due to an error, it is likely that the instruction watchdog_kick will also fail to be executed and therefore the processor 111 will be reset automatically in due course by the watchdog function.

Embodiments of the invention have the advantage that a risk that a processor 111 becomes stuck executing an endless loop of code until power to the processor 111 is cut (or other intervention is made) is reduced substantially.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of managing shutdown of a motor vehicle comprising:
    (a) determining by electronic control means that an instruction for the motor vehicle to remain in a non-shutdown state has not been received and/or that a valid input requiring the motor vehicle to remain in a non-shutdown state is not present; and
    (b) shutting down automatically the electronic control means in dependence on the determination, the method comprising the steps of determining that a fresh instruction for the motor vehicle to remain in a non-shutdown state has not been received and the electronic control means has not shut down within a prescribed time period for shutdown, and in dependence on that determination, forcing shutdown of the electronic control means after the prescribed time period for shutdown has elapsed.

2. The method as claimed in claim 1 wherein step (b) comprises executing by the electronic control means computer program code associated with shutdown of the electronic control means thereby to shut down the electronic control means in dependence on the determination.

3. The method as claimed in claim 1 wherein the step of forcing shutdown of the electronic control means comprises:
    resetting the electronic control means; and/or
    terminating electrical power to the electronic control means.

4. The method as claimed in claim 3 wherein the step of resetting the electronic control means is followed by the step of determining whether it is still not required for the motor vehicle to remain in a non-shutdown state; if it is determined that it is still not required for the motor vehicle to remain in a non-shutdown state, the method further comprising shutting down the electronic control means.

5. The method as claimed in claim 1 wherein step (a) comprises the step of commencing measurement of elapsed time responsive to the determination that it is not required for the motor vehicle to remain in a non-shutdown state.

6. The method as claimed in claim 5 wherein step (b) comprises the step of:
    (b1) executing a portion of a computer program code associated with shutdown of the electronic control means;
    (b2) checking that it is still not required for the motor vehicle to remain in a non-shutdown state and that the prescribed time period has not elapsed;
    (b3) repeating steps (b1) and (b2) until the electronic control means shuts down or the prescribed time period has elapsed.

7. The method as claimed in claim 6 wherein step (b1) comprises the step of executing a portion of a computer program code arranged to update a memory of the motor vehicle.

8. The method as claimed in claim 6 wherein at least one of steps (b1) to (b3) comprises the step of triggering a watchdog function.

9. The method as claimed in claim 8 wherein the watchdog function is configured to force a reset of the electronic control means if the watchdog is not triggered within a prescribed time period of a preceding trigger.

10. The method as claimed in claim 1 wherein the prescribed period corresponds to a period equal to the maximum expected period of time that may be taken for the electronic control means to shutdown under normal operating conditions without the forced shutdown.

11. The method as claimed in claim 1 wherein the prescribed period corresponds to a period greater than the maximum expected period of time that may be taken for the electronic control means to shutdown under normal operating conditions without the forced shutdown.

12. The method as claimed in claim 1 wherein the control means comprises one or more computing devices.

13. A motor vehicle comprising at least one control means, the control means being arranged to shutdown when it is required to shut down the motor vehicle, the control means being configured to:
    (a) determine that an instruction for the motor vehicle to remain in a non-shutdown state has not been received and/or that a valid input requiring the motor vehicle to remain in a non-shutdown state is not present; and
    (b) responsive to the determination that it is not required for the motor vehicle to remain in a non-shutdown state, determine that a fresh instruction for the motor vehicle to remain in a non-shutdown state has not been received and the control means has not shut down within a prescribed time period for shutdown, and in dependence on that determination, force shutdown of the control means after the prescribed period for shutdown has elapsed.

14. The motor vehicle as claimed in claim 13 wherein the control means comprises one or more computing devices.

15. A controller configured to perform the method of claim 1.

* * * * *